(12) United States Patent
Bokämper et al.

(10) Patent No.: US 6,240,800 B1
(45) Date of Patent: Jun. 5, 2001

(54) ELECTROMOTORIC OPERATING MECHANISM FOR HEIGHT ADJUSTMENT OF AN ARTICLE OF FURNITURE

(75) Inventors: Ralf Bokämper, Lübbecke; Andreas Roither, Blelefeld, both of (DE)

(73) Assignee: Dewert Antriebs- und Systemtechnik GmbH & Co. KG, Kirchlengern (DE)

( * ) Notice: Subject to any disclaimer, the term of this patent is extended or adjusted under 35 U.S.C. 154(b) by 0 days.

(21) Appl. No.: 09/339,747

(22) Filed: Jun. 24, 1999

(30) Foreign Application Priority Data

Jun. 29, 1998 (DE) .......................................... 298 11 566 U

(51) Int. Cl.[7] ...................................................... F16C 1/10
(52) U.S. Cl. ............................................ 74/500; 74/89.15
(58) Field of Search .................................. 74/500, 89.15, 74/424.8 R, 459; 192/69.8, 69.81

(56) References Cited

U.S. PATENT DOCUMENTS 4,741,226 * 5/1988 Bernard et al. .......................... 74/625
4,773,518 * 9/1988 Raad et al. .......................... 192/84 C
5,950,774 * 9/1999 Lang et al. .......................... 188/134

* cited by examiner

Primary Examiner—David Fenstermacher
(74) Attorney, Agent, or Firm—Henry M. Feiereisen

(57) ABSTRACT

An electromotoric operating mechanism, such as a single drive or dual drive, for height adjustment of an article of furniture, especially for furniture items useful in the field of hospitals and/or nursing, includes a drive having an output member in the form of a worm wheel, a spindle mechanism including an adjusting spindle in driving relationship with the drive, and a spindle nut mounted on the adjusting spindle and interacting with a link member in fixed rotative engagement with a shaft of an adjustable piece of furniture, and a clutch mechanism releasably coupling the output member with the adjusting spindle. The clutch mechanism includes a guide member, which is fixedly secured on the adjusting spindle, and a clutch gear, with the worm wheel rotatably mounted on the guide member. The clutch gear is arranged on the guide member in fixed rotative engagement but axially displaceable relative thereto. Normally, the clutch wheel is in engagement with the worm wheel, but can be moved out of engagement with the worm wheel for disengagement of the driving connection between the spindle mechanism and the drive.

10 Claims, 3 Drawing Sheets

ELECTROMOTORIC OPERATING MECHANISM FOR HEIGHT ADJUSTMENT OF AN ARTICLE OF FURNITURE

CROSS-REFERENCES TO RELATED APPLICATIONS

This application claims the priority of German Patent Application Serial No. 298 11 566.2, filed Jun. 29, 1998, the subject matter of which is incorporated herein by reference.

BACKGROUND OF THE INVENTION

The present invention relates, in general, to an electromotoric operating mechanism, such as a single drive or dual drive, for height adjustment of an article of furniture, especially for furniture items useful in the field of hospitals and/or nursing, and more particularly relates to an operating mechanism of a type including an adjusting spindle actuated by a drive having a worm wheel and having mounted thereon a spindle nut which interacts with a link member in fixed rotative engagement on a shaft of an adjustable piece of furniture, with the driving relationship between the output pin of the drive and the adjusting spindle being disengageable.

An electromotoric operating mechanism for this type is applicable for a wide variety of different articles of furniture, for example beds, slatted bed frames or the like. Normally, elevating and lowering of the respective furniture component is realized at a relatively slight speed when the electromotoric operating mechanism is turned on. However, in particular hospitals or nursing homes demand occasionally a lowering of the adjustable furniture item at a significantly higher speed. Various constructions have been proposed to mechanically disengage the drive train between the output pin of the drive and the adjusting spindle.

A conventional operating mechanism includes the disposition of a first clutch disk in fixed rotative engagement on the output pin of the drive. A second clutch disk is wedged in fixed rotative engagement onto the associated end of the adjusting spindle. Both clutch disks are brought into engagement by a coupling sleeve which travels in axial direction. The clutch disk mounted on the output pin and the coupling sleeve have complementary teeth of asymmetric configuration so that the coupling sleeve is driven in synchronism by the first clutch disk when the furniture item is raised by the drive, and turns idle when the furniture item is adjusted by hand in a same direction while the first clutch disk is at a standstill.

This conventional construction suffers the drawback of requiring a relatively large number of components in order to realize the disengagement of the drive train. Moreover, as the coupling sleeve embraces the second clutch disk, the drive exhibits a substantial size. Operating systems for articles of furniture are marketed in large numbers so that cost-efficiency is of great concern.

SUMMARY OF THE INVENTION

It is thus an object of the present invention to provide an improved electromotoric operating mechanism for articles of furniture, obviating the afore-stated drawbacks.

In particular, it is an object of the present invention to provide an improved electromotoric operating mechanism for articles of furniture, which is simple in construction with a compact design and a comparably small number of components while yet enabling a reliable disengagement of the drive train.

These objects, and others which will become apparent hereinafter, are attained in accordance with the present invention by providing a drive having a worm wheel on an output side, a spindle mechanism including an adjusting spindle in driving relationship with the drive, and a spindle nut mounted on the adjusting spindle and interacting with a link member in fixed rotative engagement with a shaft of an adjustable piece of furniture, and a clutch mechanism releasably coupling the worm wheel with the adjusting spindle, with the clutch mechanism including a guide member, fixedly secured on the adjusting spindle, and a clutch gear, wherein the worm wheel is rotatably mounted on the guide member and the clutch gear is arranged on the guide member in fixed rotative engagement but axially displaceable relative thereto, and movable with respect to the worm wheel between an engaging position and a disengaging position.

In accordance with the present invention, the worm wheel is so configured that during normal operation the driving force is transmitted by the worm wheel to the adjusting spindle via the clutch gear and the guide member. In the event, the furniture item should be lowered in a shortest possible time at respectively high lowering speed, the clutch gear is disengaged from the worm wheel, whereby the adjusting spindle as well as the guide member and the clutch disk rotate idle while the worm wheel and the drive are at a standstill.

The configuration of the electromotoric operating mechanism according to the present invention results in a comparably small size which, if at all, is only negligibly different from operating mechanism without having any disengagement feature.

Suitably, the worm wheel is linked to the clutch gear by providing the worm wheel at the clutch gear confronting side with a circular ring of teeth, and by providing the clutch gear at the facing side with complementary teeth. As a result, a slip-free connection is realized which can be subjected to great loads. The teeth may be of serrated configuration, with each tooth being bounded by a steep flank and a flat flank with respect to the pivot axes of the worm wheel and the clutch gear. During normal operation, when raising the furniture item, the torque is transmitted via the steep flanks of the teeth of the worm wheel and the clutch gear. This torque transmission is realized, however, only in the respective direction of rotation. In the opposite rotation direction, e.g., when the attached furniture item is being lowered, the clutch gear rotates out of the worm wheel and travels in axial direction.

According to another feature of the present invention, the operating mechanism includes an actuator for moving the clutch gear between the engaging position and disengaging position, with the clutch gear having an outer perimeter formed with a receptacle, for example a circumferential groove, for receiving the actuator. The actuator is suitably loaded by an energy-storing member, such as a spring, which continuously seeks to urge the clutch gear against the worm wheel. When the attached furniture item should be lowered at increased speed, the actuator is used to disengage the clutch gear from the worm wheel. As the spindle drive is not self-locking, the applied load causes the spindle drive to rotate and to act upon the lifting tube which is linked to the furniture item via the link member. In this situation, the spindle drive is no longer braked by the worm drive. Examples for an actuator include a spring-loaded release lever, a Bowden cable assembly or similar device.

Suitably, the teeth of the worm wheel and the clutch gear are of serrated configuration.

According to another feature of the present invention, the clutch gear is positioned at the spindle nut distant side of the worm wheel so that the stroke of the spindle nut is not restricted.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
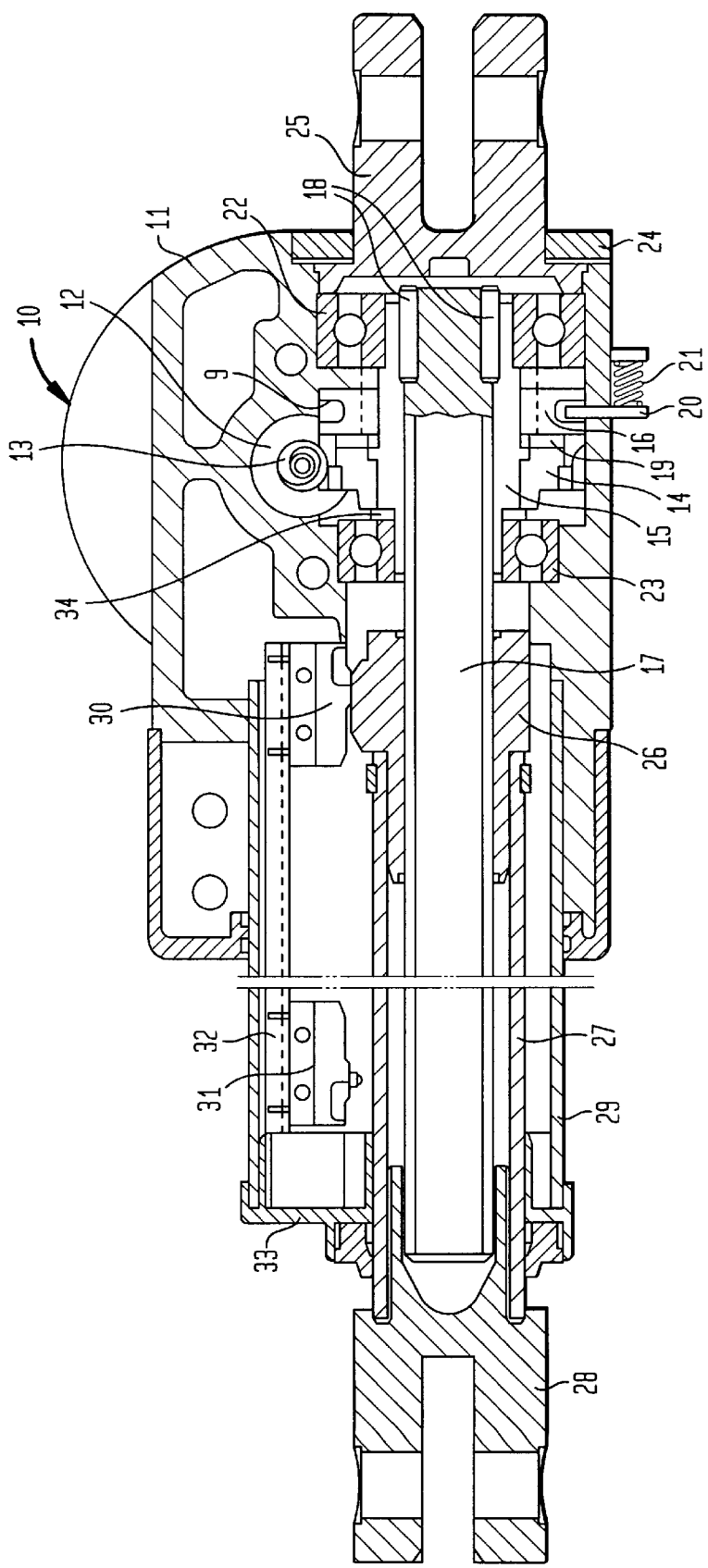
FIG. 1 is a sectional view of one embodiment of an electromotoric operating mechanism for a furniture item, in accordance with the present invention, in the form of as single drive.

Throughout all the Figures, same or corresponding elements are generally indicated by same reference numerals.

Turning now to the drawing, and in particular to FIG. 1, there is shown an electromotoric operating mechanism according to the present invention and generally designated by reference numeral 10, useful for height adjustment of an article of furniture (not shown). The operating mechanism 10 includes a housing 11 which accommodates a drive 12 that drives a worm 13 via a worm wheel 14. It will be appreciated by persons skilled in the art that the drive 12 must contain much mechanical apparatus which does not appear in the foregoing Figures. However, this apparatus, like much other necessary apparatus, is not part of the invention, and has been omitted from the Figures for the sake of simplicity.

The worm wheel 14 rotates freely on a guide member 15. Mounted in fixed rotative engagement on the guide member 15 is a clutch gear 16 which, during normal operation, is in engagement with the worm wheel 14. The guide member 15 is mounted in fixed rotative engagement on a spindle 17 by means of pins 18 which are inserted in respective bores formed axially between the spindle 17 and the guide member 15. The interconnection between the clutch gear 16 and the worm wheel 14 is realized by complementary teeth 19, as will be described furtherbelow.

The clutch gear 16 has an outer perimeter formed with a wraparound groove 9 for receiving an actuator in the form of a release lever 20 by which the driving relationship between the drive 12 and the spindle 17 can be disengaged. The release lever 20 is so loaded by a spring 21 that the clutch gear 16 is in meshing engagement with the worm wheel 14 via the teeth 19. The spindle 17 is supported at both axial end faces of the guide member 15 by grooved ball bearings 22, 23, whereby the ends of the guide member 15 are inwardly recessed to accommodate the ball bearings 22, 23. The housing 11 of the electromotoric operating mechanism 10 is closed at its end proximate to the guide member 15 by means of a cover 24 which has a central opening for receiving a fork head 25 by which the operating mechanism 10 can be suitably suspended in a manner not shown in detail.

Mounted on the spindle 17 is a spindle nut 26 which supports a lifting tube 27. At its guide member distant end, the lifting tube 27 carries a further fork head 28 for attachment of the operating mechanism 10, for example, to a link lever (not shown) which is in fixed rotative engagement with the furniture item to be adjusted.

Projecting out of the housing 11 is a flanged tube 29 which is so expanded on one side as to form a rectangular compartment for accommodating two end switches 30, 31 for adjustment of the stroke of the spindle nut 26. The end switches 30, 31 are suitably mounted on a strip 32 which is formed as a track of punched holes. The flanged tube 29 is closed by an end cap 33. A support disk 34 is further incorporated between the grooved ball bearing 33, which confronts the spindle nut 26, and the guide member 15.

Figure 5:
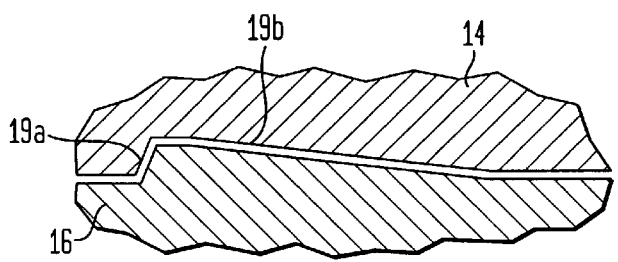
FIG. 5 is a schematic view of an engagement between the worm wheel and the clutch gear, in accordance with the present invention.

As shown in FIG. 1, the clutch gear 16 is disposed at the spindle nut distal side of the worm wheel 14, with the teeth 19 of the worm wheel 14 and the clutch gear 16 arranged about a ring. The teeth 19 are configured asymmetrically in the form of saw teeth. Thus, as shown in FIG. 5, each tooth is bounded by a steep flank 19a, which extends parallel or nearly parallel to the pivot axes of the worm wheel 14 and the clutch gear 16, and a flat flank 19b. When activating the electromotoric operating mechanism 10 for elevating the furniture item, the torque is transmitted by the steep flanks 19a of the teeth 19. When lowering the furniture item, while the operating mechanism 10 is on and, for example, blocked by a body part, the clutch gear 16 rotates with respect to the worm wheel 14 and moves in axial direction in opposition to the action applied by the spring 21, thereby establishing a freewheel feature for safety purposes. If, however, it is desired to disengage the drive 12 so as to lower the furniture item at significantly higher speed, the release lever 20 is actuated to move the clutch gear 16 out of engagement from the worm wheel 14. As the spindle 17 is not self-locking, a brakeless rotation thereof is possible.

An important aspect of the operating mechanism according to the present invention is the fixed rotative engagement between the spindle 17 and the guide member 15 as well as the interrelationship between the clutch gear 16 and the worm wheel 14.

Figure 3:
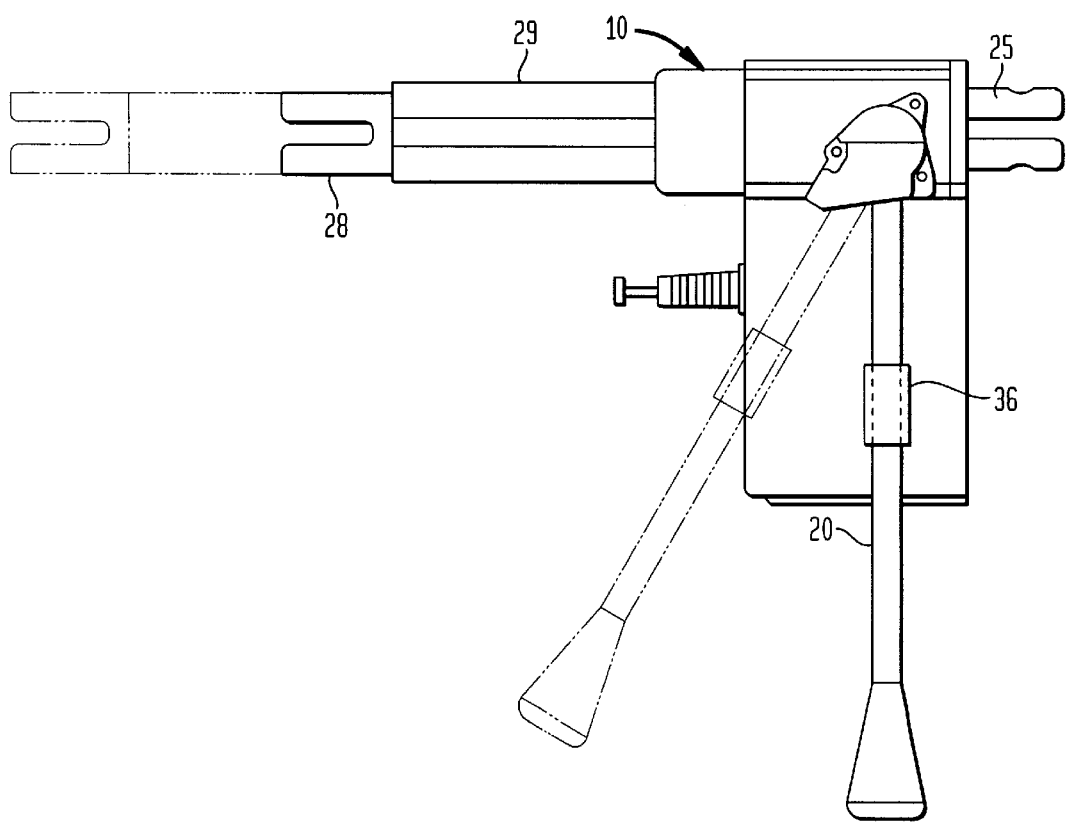
FIG. 3 is a schematic illustration of the spindle drive of the operating mechanism of FIG. 1, equipped with an actuator, in the form of a release lever, for disengagement of the clutch gear.
Figure 3A:
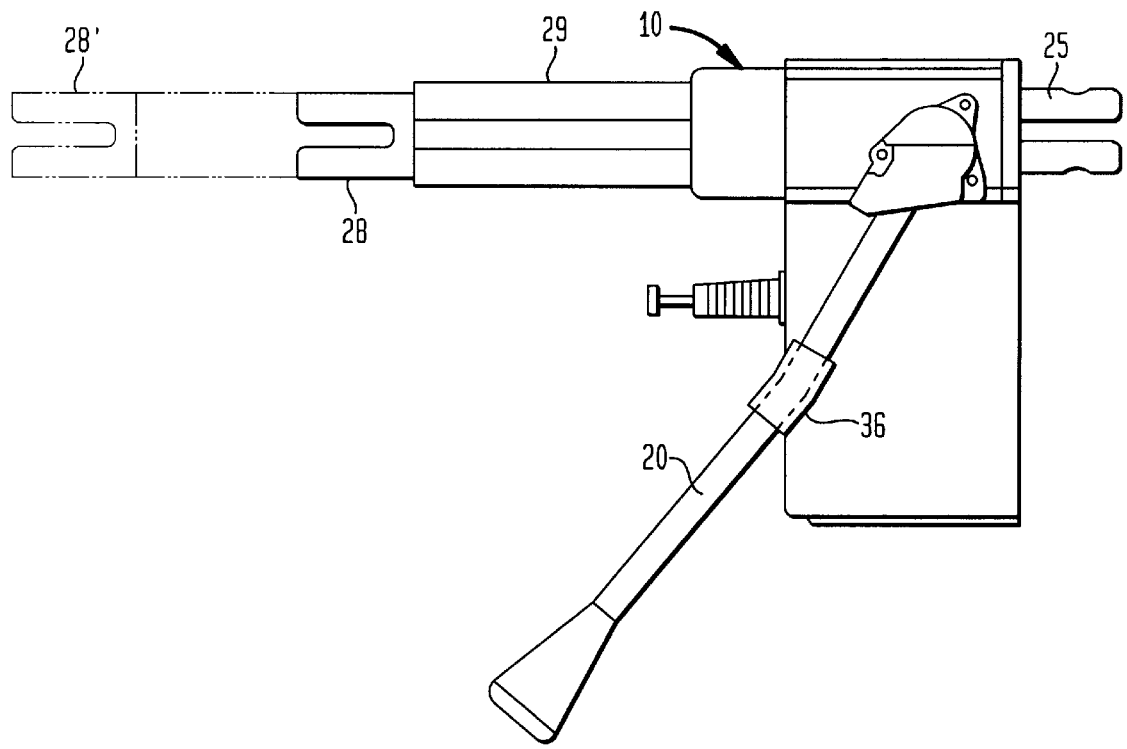
FIG. 3a is a schematic illustration of the spindle drive of the operating mechanism of FIG. 1, depicting the release lever actuated for disengagement of the clutch gear and of deformable configuration.

FIG. 3 shows a schematic illustration of the release lever 20 for realizing the disengagement of the drive 12, with the swiveled actuated position of the release lever 20 shown in dashed line. The release lever 20 may include a shaft formed in its entirety by an elastically deformable material, for example rubber or rubber-like plastic material, or, as shown in FIG. 3, only a mid-section of the shaft of the release lever 20 may be elastic, for example by providing an elastically deformable coupling piece 36, as shown in FIG. 3a.

Figure 2:
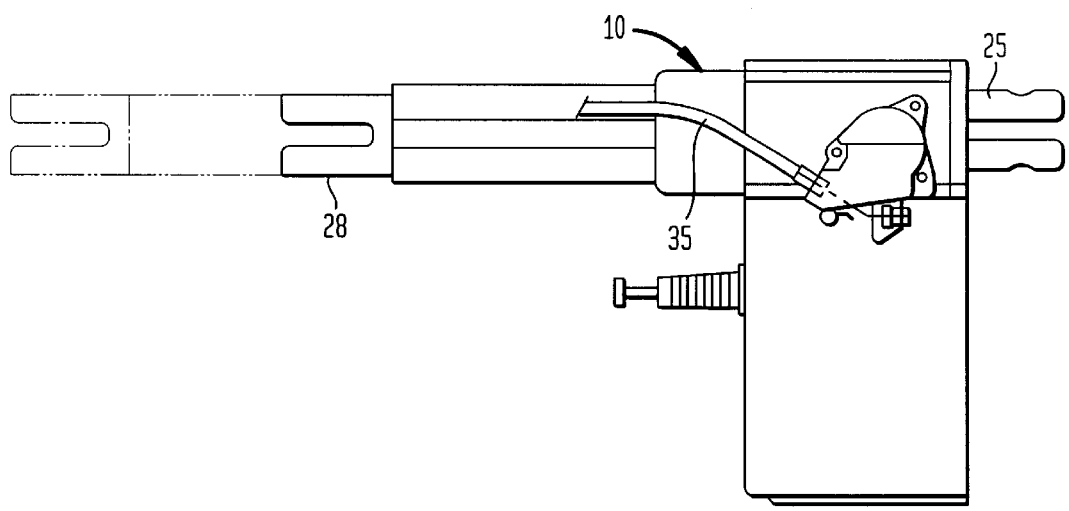
FIG. 2 is a schematic illustration of the spindle drive of the operating mechanism of FIG. 1, equipped with an actuator, in the form of a Bowden cable assembly, for disengagement of the clutch gear.

FIG. 2 shows a variation of the actuator in the form of a Bowden cable assembly 35 which includes a flexible tube in which a cable is slidably mounted.

The extended position of the fork head 28 is shown in FIGS. 2 and 3 in dashed line.

Figure 4:
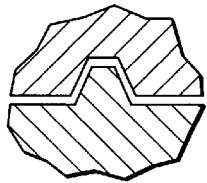
FIG. 4 is a schematic view of a conventional intermeshing engagement between a worm wheel and a clutch gear, for illustrative purposes.

FIG. 4 shows a typical conventional engagement or profile of two intermeshing gears, with each gear having teeth of trapezoidal cross section entering gaps in the confronting other gear. Thus, such an intermeshing engagement would not allow a rotation of the clutch gear 16 relative to the worm wheel 14. Unlike the engagement of FIG. 4, FIG. 5 shows a teeth profile of the worm wheel 14 and the clutch gear 16 in accordance with the present invention. Each tooth is formed, with respect to the rotation directions of the worm wheel 14 and the clutch gear 16, by a steep flank 19*a* and a flat flank 19*b*, with the flat flank 19*b* extending over a substantially greater angular zone than the steep flank 19*a*. Each tooth is thus asymmetric. A turn of the worm wheel 14 to the right co-rotates the clutch gear 16, while a standstill of the worm wheel 14 and rotation of the clutch gear 16 in the same direction causes an axial displacement of the clutch gear 16 so that the teeth of the worm wheel 14 and the clutch gear 16 travel one in front of the other, when the drive 12 is disengaged.

While the invention has been illustrated and described as embodied in a electromotoric operating mechanism for height adjustment of an article of furniture, it is not intended to be limited to the details shown since various modifications and structural changes may be made without departing in any way from the spirit of the present invention. For example, it is certainly within the scope of the present invention to complement the single-drive arrangement, shown in FIG. 1, with another drive to thereby realize a dual drive arrangement.

What is claimed is:

1. An electromotoric operating mechanism for an article of furniture, said operating mechanism comprising:

a drive having a worm wheel on an output side;

a spindle mechanism including an adjusting spindle in driving relationship with the drive, and a spindle nut mounted on the adjusting spindle and interacting with a furniture item to be moved; and a clutch mechanism releasably coupling the drive with the adjusting spindle, said clutch mechanism including a guide member, fixedly secured on the adjusting spindle, and a clutch gear, said worm wheel being rotatably mounted on the guide member and said clutch gear being arranged on the guide member in fixed rotative engagement but axially displaceable relative thereto, said clutch gear configured for movement with respect to the worm wheel between an engaging position with the worm wheel so that the spindle mechanism is capable to move the furniture item, and a disengaging position with the worm wheel so that the spindle mechanism is de-coupled from the furniture item and the worm wheel runs idle, thereby allowing a manual adjustment of the furniture item.

2. The operating mechanism of claim 1 wherein the worm wheel has a clutch gear proximate side having teeth provided on a circular ring, said clutch gear having a side confronting the side of the worm wheel and formed with teeth complementing the teeth on the worm wheel.

3. The operating mechanism of claim 2 wherein the worm wheel rotates about a pivot axis and the clutch gear rotates about a pivot axis, said teeth of the worm wheel and the clutch gear having a serrated configuration, with each tooth being formed by a steep flank and a flat flank with respect to the pivot axes of the worm wheel and the clutch gear.

4. The operating mechanism of claim 1 wherein the clutch mechanism includes a spring element destined to load the clutch gear into engagement with the worm wheel, said teeth being so configured that the clutch gear is driven by the worm wheel during upward adjustment of the furniture item, and is able to rotate relative to the worm wheel while moving back and forth in axial direction when a downward adjustment of the furniture item is obstructed.

5. The operating mechanism of claim 1, and further comprising an actuator for moving the clutch gear between the engaging position and the disengaging position, said clutch gear having an outer perimeter formed with a pocket for receiving the actuator.

6. The operating mechanism of claim 5 wherein the actuator is a Bowden cable assembly for releasing the clutch gear form the worm wheel and thereby realize a disengagement of the drive.

7. The operating mechanism of claim 5 wherein the actuator is a release lever for releasing the clutch gear form the worm wheel and thereby realize a disengagement of the drive.

8. The operating mechanism of claim 7 wherein the release lever includes a shaft made of elastically deformable material.

9. The operating mechanism of claim 7 wherein the release lever includes a shaft and at least an elastically deformable coupling element secured to the shaft.

10. The operating mechanism of claim 1 wherein the worm wheel has a proximal end and a distal side with respect to the spindle nut, said clutch gear positioned on the distal side of the worm wheel.

\* \* \* \* \*